United States Patent [19]

Stritzel

[11] Patent Number: 4,750,383
[45] Date of Patent: Jun. 14, 1988

[54] STAGGERED COMBINATION GEARS

[75] Inventor: Gene A. Stritzel, Rochester, N.Y.

[73] Assignee: The Gleason Works, Rochester, N.Y.

[21] Appl. No.: 895,870

[22] Filed: Aug. 12, 1986

[51] Int. Cl.$^4$ ............................................ F16H 1/38
[52] U.S. Cl. .................................. 74/715; 74/410; 74/427
[58] Field of Search ............... 74/409, 410, 715, 424.5, 74/425, 427, 710

[56] References Cited

U.S. PATENT DOCUMENTS

| | | | |
|---|---|---|---|
| 2,022,141 | 11/1935 | Morgan | 74/715 |
| 2,859,641 | 11/1958 | Gleasman | 74/715 |
| 2,900,846 | 8/1959 | Lehman | 74/714 |
| 2,972,265 | 2/1961 | Walter | 74/711 |
| 3,554,044 | 1/1971 | Hoglund | 74/409 |
| 3,706,239 | 12/1972 | Myers | 74/715 |
| 3,762,234 | 10/1973 | Hoglund | 74/409 |
| 3,875,824 | 4/1975 | Benjamin | 74/715 |
| 3,902,237 | 9/1975 | Benjamin | 74/715 X |
| 4,191,071 | 3/1980 | Gleasman et al. | 74/715 |
| 4,491,035 | 1/1985 | Gleasman et al. | 74/715 |
| 4,512,211 | 4/1985 | Stritzel | 74/715 |
| 4,524,643 | 6/1985 | Ziegler et al. | 74/409 X |
| 4,554,842 | 11/1985 | Wood, III | 74/409 |

FOREIGN PATENT DOCUMENTS

| | | | |
|---|---|---|---|
| 2334043 | 1/1974 | Fed. Rep. of Germany | 74/710 |
| 126156 | 9/1980 | Japan | 74/409 |
| 1436225 | 5/1976 | United Kingdom | 74/710 |

Primary Examiner—Leslie A. Braun
Assistant Examiner—Dwight G. Diehl
Attorney, Agent, or Firm—Nixon & Vanderhye

[57] ABSTRACT

Method of dispersing unit pressure loads on a worm gear meshing with a plurality of worm wheels. Worm wheels, normally arranged about the periphery of the worm gear in a single plane, are mounted in staggered relationship along the axis of the worm gear to establish dispersed contact paths on the worm gear.

16 Claims, 3 Drawing Sheets

STAGGERED COMBINATION GEARS

BACKGROUND OF THE INVENTION

The present invention relates to gear assemblies in general and, more specifically, to a differential gear assembly which includes a gear case, a pair of drive axles received in bores formed in the sides of the case, and a differential gear arrangement mounted centrally in the case for driving the axles. The case for the differential assembly may include a flange for receiving a ring gear or other means for providing power input to the differential from the drive shaft of the vehicle in a conventional manner.

Conventional differential assemblies utilize four inter-engaged bevel gears that rotate about two orthogonal axes. In contrast, the differential assembly which is associated with this invention, is of the type that does not utilize bevel gears, and is generally of the design shown in U.S. Pat. No. 2,859,641 issued Nov. 11, 1958 in the name of Gleasman. This patent is incorporated herein by reference to the extent necessary to provide specific details of the structure of the assembly. This type of differential (hereinafter referred to as a "worm-type differential") includes worm or side gears, coupled to each axle end as drive gears, together with so called balancing or transfer gears associated with each of the side gears and in mesh with each other for transferring and dividing torque between the axle ends. The transfer gears are mounted in pairs, and each transfer gear of a pair rotates on an axis of rotation that is substantially parallel to a tangent of the envelope of an associated axle drive gear.

The transfer gears are in reality combination gears, i.e., the middle portion of each gear constitutes a worm wheel portion while the outer ends of the gear are formed with integral spur gear portions. The arrangement is such that, for any given pair of combination gears, the worm wheel portion of a first combination gear meshes with one side gear while the worm wheel portion of a second combination gear meshes with the other side gear, and the spur gear portions of the respective combination gears mesh with each other.

In one example of the worm-type differential assembly, a set of three combination gears are arranged substantially in a first single plane at approximately 120° intervals about the periphery of each side gear, each of the three combination gears being paired with a combination gear of a second set of three combination gears similarly arranged with respect to the second side gear in a second single plane parallel to the first plane.

Because of the substantially planar arrangement of each set of combination gears about the circumference of each side gear, a single zone of contact is established about the surface of each side gear at the meshing point between the combination gears of each set and its respective side gear. In this zone, Hertzian stresses are concentrated leading to possible surface deterioration and wear along the relatively short and narrow contact path and, ultimately, to shortened differential life.

It is a principal object of this invention to improve the durability life of the side gears and combination gears in a worm-type differential assembly. In the present invention, the mounting locations of at least one pair of combination gears is staggered or offset with respect to the mounting locations of the remaining pair of combination gears in a direction substantially parallel to the axes of rotation of the side gears. As a result, unit pressure loads are dispersed over a larger zone of contact on each side gear, heat dissipation is improved, surface deterioration is distributed over a greater area of the side gears and lubricant life is extended. Consequently, the durability and functional life of the entire differential assembly is also improved.

While the exemplary embodiment is particularly designed for application with the worm-type differential, similar benefits may accrue in any gear assembly where a plurality of worm wheels or gears presently mesh with a single worm or helical gear along a single contact path.

DETAILED DESCRIPTION OF THE DRAWINGS

Figure 1:
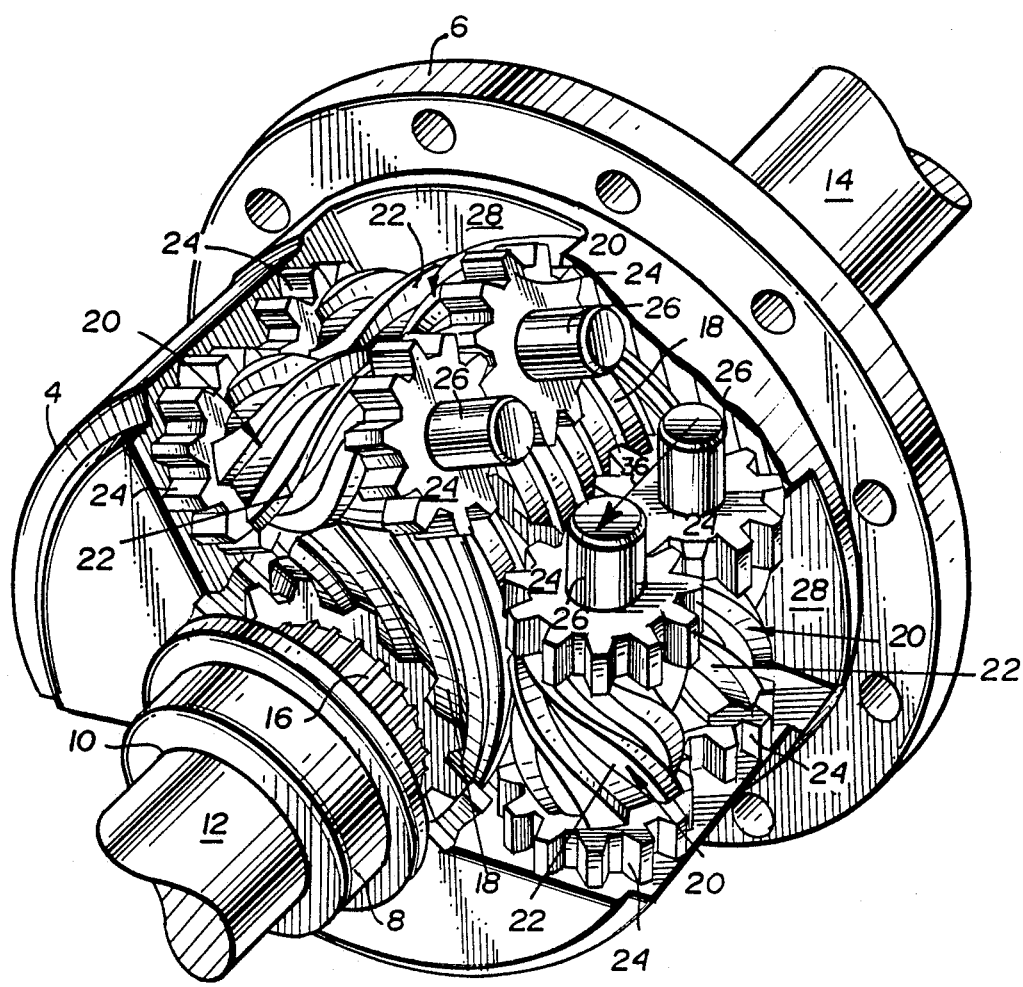
FIG. 1 is a perspective view of a known worm-type differential gear assembly.
Figure 2:
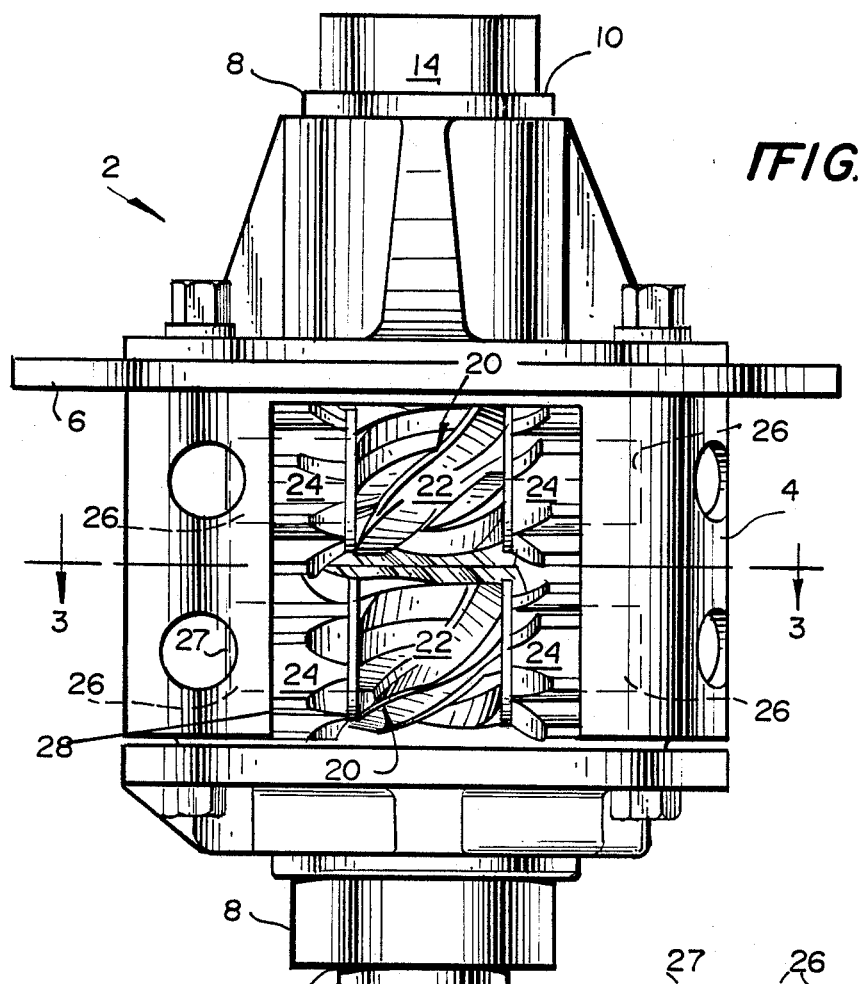
FIG. 2 is a side view of the differential gear assembly shown in FIG. 1.
Figure 3:
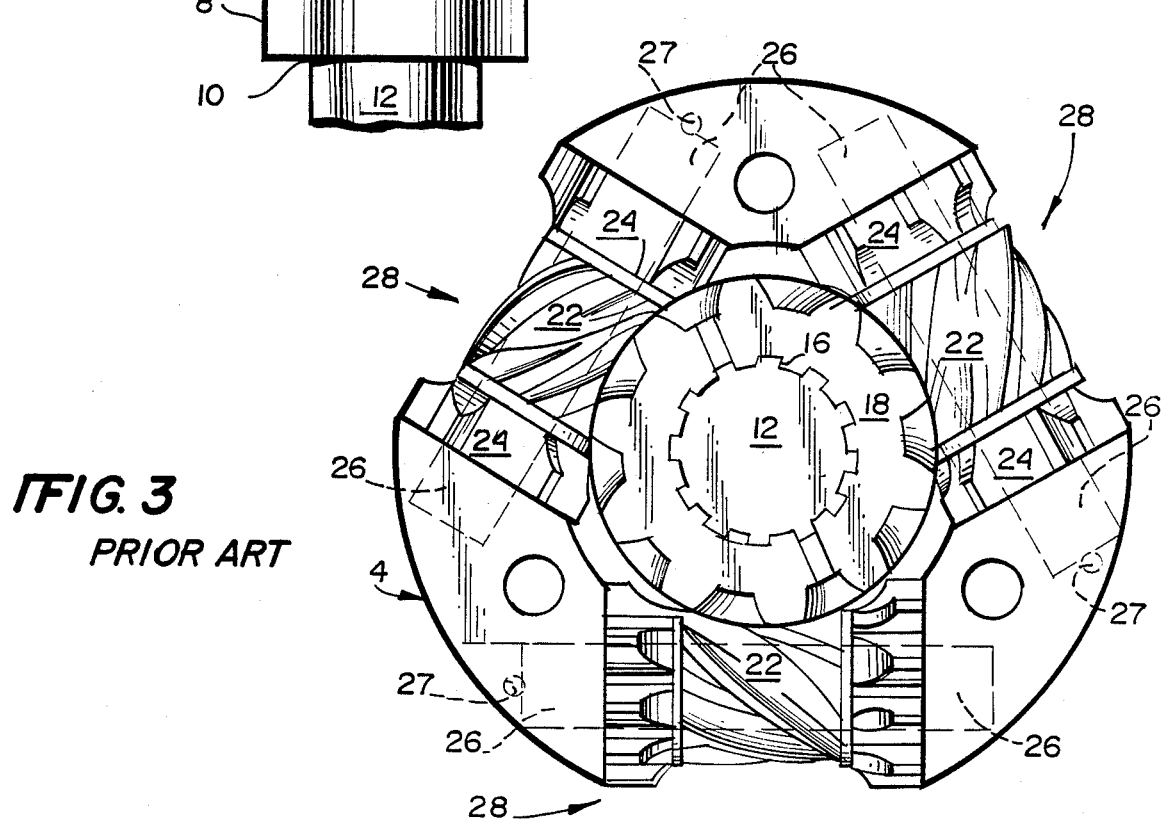
FIG. 3 is a top plan view taken along the line 3—3 of FIG. 2.

Referring to FIGS. 1-3, the known worm-type differential assembly 2 includes a differential case 4 provided with a flange 6 to which a conventional ring gear (not shown) is suitably attached. The ring gear receives power input from the drive train of a vehicle in a well-known manner. The differential case 4 also includes a pair of spaced apart trunions 8 which are adapted to receive bearings (not shown) by which the differential case is rotatably mounted inside a conventional differential or axle housing (not shown).

The differential case 4 also includes a pair of axle receiving bores 10 which are at least partially defined by the trunions 8 and through which axle shaft ends 12, 14 extend into engagement with the differential gear assembly inside the case. In particular, each axle shaft end includes external splines 16 which engage mating, internal splines of a helical worm, or side, gear 18.

As more clearly illustrated in FIG. 3, each side gear 18 meshes with three balancing or transfer gears 20 which are located at 120° intervals about the periphery of the respective side gear and arranged generally tangentially to, and engaged with, the pitch surface of the side gear. This arrangement is also known as a crossed-axis, compound planetary gear complex. These transfer gears, which are hereinafter referred to as combination gears, are each formed with a middle portion which constitutes a worm wheel portion 22 and integral end portions which constitute spur gear portions 24. Each combination gear is mounted for rotation about a shaft 26, the ends of which extend beyond the gear and serve to mount the gear within the gear case 4. The combination gears 20 may be held in place by any suitable means, such as pins 27.

With specific reference to FIGS. 1 and 3, it can be seen that each side gear 18 meshes with worm wheel portions 22 of a set of three associated combination gears 20. At the same time, the spur gear portions 24 of each combination gear associated with one side gear meshes with the spur gear portions of adjacent combination gears associated with the other of the two side gears. Thus, as clearly illustrated in FIG. 1, each of the three combination gears 20 associated with one side gear 18 is paired with a combination gear associated with the other side gear.

To accommodate each combination gear pair, the case 4 is formed with three peripherally arranged "windows" or slots 28 extending radially inwardly from the periphery of the case 4. Each window or slot 28 receives one pair of combination gears, as particularly shown in FIG. 2. It is this arrangement which provides for the transfer and division of torque between axle ends.

In the worm-type differential assembly, the three combination gears 20 associated with either of the side gears 18 are arranged in a substantially planar configuration, i.e., the axes of rotation of the three combination gears associated with one of the side gears all lie in substantially the same plane and extend substantially transverse to the axis of rotation of the associated side gear. Because of this arrangement, the area of frictional contact, i.e., the meshing point between each combination gear and its associated side gear is substantially the same. In other words, contact between one set of three combination gears 20 and an associated side gear 18 occurs along a relatively short and narrow path on the periphery of the side gear. Along this path, or zone, substantial Hertzian stresses are concentrated, leading to rapid surface deterioration or wear of the side gear. At the same time, substantial localized heat build-up in this area leads to the degradation of the gear material and lubricant. As a result, the durability and life of the side gears and combination gears is shortened.

Figure 4:
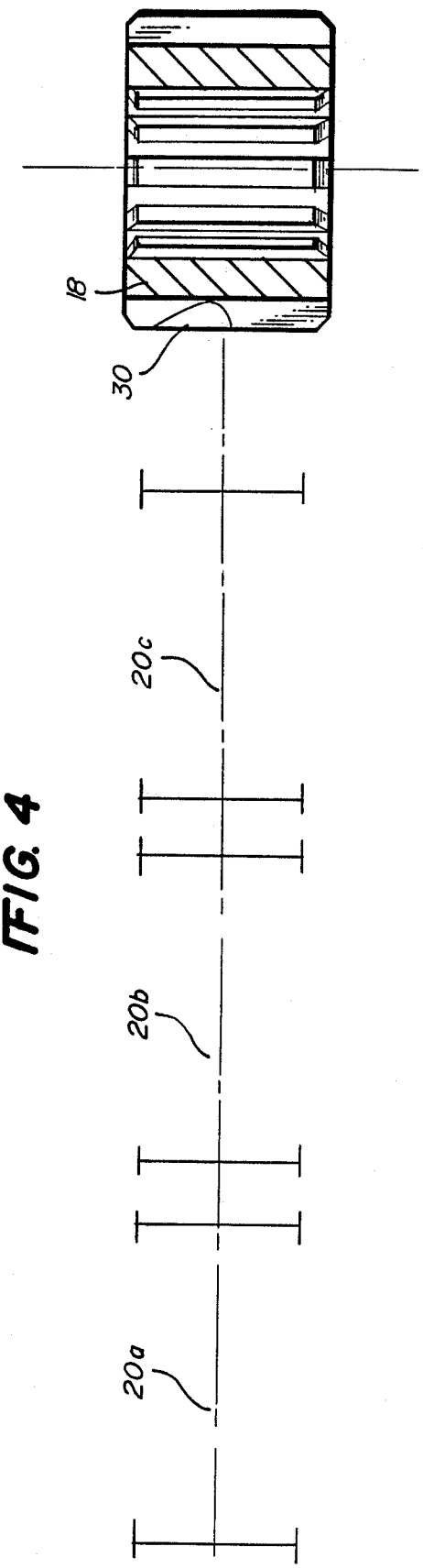
FIGURE 4 is a schematic representation illustrating the substantially planar arrangement of one set of combination gears relative to an associated side gear in the known worm-type differential and further illustrating the resulting concentrated contact pattern on the side gear.

The planar alignment of a set of combination gears in the prior art worm-type differential assembly is represented schematically in FIG. 4. Combination gears 20a, 20b and 20c are represented with their center lines lying essentially in a single plane, resulting in significant side gear wear in a short and narrow zone 30, the contact pattern shown in exaggerated form for ease of understanding.

Figure 5:
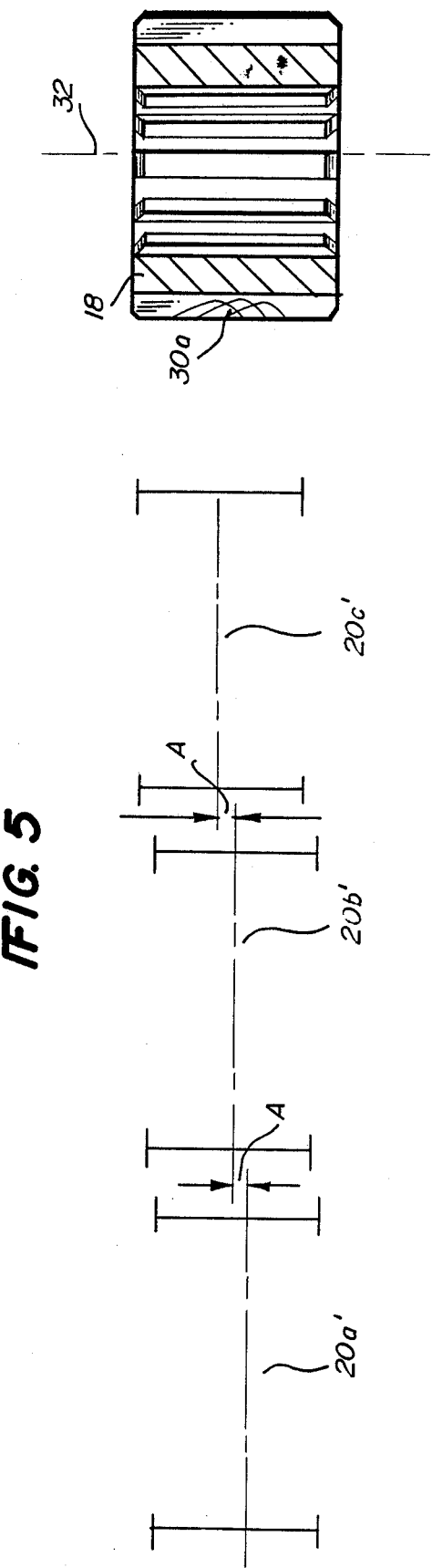
FIG. 5 is a schematic representation of the staggered arrangement of one set of combination gears relative to an associated side gear in accordance with the present invention and further illustrating the resulting dispersed contact pattern on the side gear.

In FIG. 5, there is shown a schematic representation of the staggered alignment of a set of combination gears which is the subject of an exemplary embodiment of this invention. The center lines of the respective combination gears are staggered or offset with respect to each other in a direction along or parallel to the longitudinal axis of rotation 32 of the side gear 18. The amount of the offset between gear 20a and 20b, for example, indicated by the dimension A in FIG. 5, is that which is achieved by, in effect, rotating the worm wheel portion of gear 20b from its normally planar alignment approximately one-quarter pitch. Pitch, in this context, is defined as the distance along the pitch circle between corresponding profiles of adjacent teeth. The corresponding axial offset is then utilized as the basis for establishing the mounting locations for each pair of combination gears within the case 4.

It is to be remembered that the combination gears are paired, so that in order to achieve the staggered configuration and maintain the intermeshing relationship therebetween, both gears of a pair must be offset along the axes of the side gears. Because the offset or stagger is quite small in absolute terms, an arrow 36 has been added to FIG. 1 to illustrate how the associated gear pair may be offset in one or the other of two directions along the axes of the side gears 18 and axle shafts 12, 14.

With specific reference to the worm-type differential, it is apparent that the combination gear, side gear assembly is confined within a relatively small window or slot within the gear case and that, as a practical matter, there is only limited space available for shifting or offsetting the normally planar arrangement of the combination gears. Nevertheless, it has been found that an offset or stagger, even as small as that which corresponds to a turn of the combination gear worm wheel portion one-quarter pitch along the side gear from a standard reference point, is sufficient to realize significant improvements in differential durability.

Referring again to FIG. 5, each combination gear shown to be offset with respect to each other, so that three separate, albeit overlapping, contact patterns are established on the associated side gear, also shown in exaggerated form at 30a. It is believed apparent that where each of the three combination gears are offset with respect to each other, as is the case in FIG. 5, the total offset, as measured between the center lines of any two combination gears within a set is equal to 2A, or an amount corresponding to rotation of the worm wheel portion of the combination gear through one-half pitch. While this is the preferred arrangement, it is to be understood that the advantages of this invention may be obtained, to a somewhat lesser degree, by offsetting at least one combination gear pair with respect to the two remaining pairs.

As a result of the staggered or offset relationship as described herein, the potentially damaging Hertzian stresses are dispersed over a greater area of the side gears, resulting in extended gear durability and life. In addition, because of concurrently improved heat dissipation, lubricant life is also extended, contributing to overall improved durability of the differential assembly as a whole.

While the present invention has been described with particular reference to the worm-type differential gear assembly, the staggered gear relationship disclosed herein has application to any of a variety of gear assemblies where a plurality of worm wheels or gears normally mesh with a single worm or helical gear along a substantially common contact path. Moreover, it should be further understood that various changes can be made to the exemplary embodiment of the invention without departing from the spirit and scope of the invention as defined by the claims which follow.

What is claimed is:

1. A method of dispersing unit pressure loads on a worm gear having a first axis of rotation and meshing with a plurality of worm wheels arranged tangentially about the periphery of the worm gear, said worm wheels having axes of rotation, respectively, which extend substantially transverse to said first axis of rotation, the method comprising:

staggering the axis of rotation of at least one of the worm wheels with respect to the axes of rotation of the remaining worm wheels at substantially fixed axial positions along the worm gear in a direction substantially parallel to said first axis of rotation, so as to establish at least one additional path of contact on the worm gear, and thereby disperse portions of the load transmitted between the worm gear and worm wheels over a larger zone of contact on the worm gear.

2. The method as defined in claim 1 and including the step of rotatably mounting three worm wheels in a common housing and arranging said three worm wheels tangentially at 120° intervals about the periphery of the worm gear.

3. The method as defined in claim 2 and further comprising:
staggering the axis of rotation of each of the three worm wheels, relative to each other, axially along the worm gear.

4. The method as defined in claim 2, and including the step of staggering the axis of rotation of the at least one worm wheel with respect to the axes of rotation of the remaining worm wheels by a distance corresponding to a one-quarter pitch turn of the worm wheel along the worm gear.

5. A method of dispersing unit pressure loads on a pair of substantially axially aligned helical worm gears, each of which engages and meshes with a plurality of combination gears, said combination gears each formed with a centrally located worm wheel portion, and spur gear portions at either end thereof, said combination gears arranged in at least two pairs such that, with respect to each pair, the worm wheel portion of one combination gear of a pair meshes with one helical worm gear and the worm wheel portion of the other combination gear of the pair meshes with the other helical worm gear, the spur gear portions of the one combination gear of the pair meshing with the spur gear portions of the other combination gear of the pair, said method comprising:
staggering the mounting location of at least one pair of combination gears with respect to the remaining pair axially along the substantially aligned helical worm gears to establish at least two partially overlapping zones of contact on the surface of each helical worm gear.

6. The method as defined in claim 5, wherein three pair of combination gears are utilized, the method comprising:
staggering the mounting locations of each pair of combination gears with respect to each of the remaining pairs to establish three partially overlapping zones of contact on the surface of each helical worm gear.

7. The method as defined in claim 6, wherein the mounting location of each pair of combination gears is staggered with respect to each remaining pair of combination gears by an amount corresponding to at least a quarter pitch but not more than a half pitch turn of the worm wheel portion of the combination gear along the worm gear.

8. In a differential gear assembly of the type including a differential case having means for receiving a pair of axle ends, substantially axially aligned side gears disposed within said case and rotatably coupled to said axle ends, at least two combination gears associated with each said side gear, each of said combination gears including a centrally located worm wheel portion with spur gear portions formed at either end thereof, said combination gears being arranged in at least two pairs such that with respect to each pair, the worm wheel portion of one combination gear of a pair meshes with one side gear and the worm wheel portion of the other combination gear of the pair meshes with the other side gear, the spur gear portions of one combination gear of the pair meshing with the spur gear portions of the other combination gear of the pair, each said combination gear pairs arranged tangentially to the periphery of the worm gear and rotatably mounted in a gear window formed in said case, the improvement comprising:
the mounting location of one combination gear pair in one gear window being offset with respect to the remaining combination gear pair in a direction parallel to the longitudinal axes of the side gears, wherein the side gear engaging worm wheel portions of the combination gears associated with each side gear establish multiple overlapping zones of contact on each of said side gears.

9. A differential gear assembly as defined in claim 8, wherein three combination gears are associated with each side gear, the combination gears arranged in three pairs at 120° intervals about the periphery of the side gears.

10. A differential gear assembly as defined in claim 9, wherein the mounting locations of each pair of combination gears are offset with respect to those of each of the remaining pairs so as to establish three overlapping zones of contact on the surface of each worm gear.

11. A differential gear assembly as defined in claim 10, wherein the axial offset between any two pair of the three combination gear pairs corresponds to a quarter pitch but not more than a half pitch turn of the worm wheel portion of a combination gear along the associated side gear.

12. A gear set comprising:
a first helical worm gear having a longitudinal axis of rotation;
first and second worm wheels arranged tangentially about, and in meshing engagement with, the helical worm gear, said worm wheels having axes of rotation respectively, which extend transverse to the longitudinal axis of rotation of the helical worm gear; wherein, the axes of rotation of the worm wheels are offset with respect to each other in a direction along the longitudinal axis of rotation of the helical worm gear to thereby disperse unit pressure loads transmitted between the worm gear and worm wheels over a larger zone of contact on the worm gear.

13. A gear set as defined in claim 12, and further comprising:
a third worm wheel arranged tangentially to the helical worm gear such that the first, second and third worm wheels are arranged at 120° intervals about and in meshing engagement with the helical worm gear, and wherein the axis of rotation of at least one of the worm wheels is offset from the rotational axes of the remaining worm wheels in a direction along the axis of rotation of the helical worm gear.

14. A gear set as defined in claim 13 wherein the rotational axes of each of the worm wheels is offset with respect to the rotational axis of each other worm wheel along the axis of rotation of the helical worm gear.

15. A gear set as defined in claim 14 wherein the amount of offset between the axes of rotation of any two worm wheels is at least equal to a distance corresponding to rotation of the worm wheel along the helical worm gear through one-quarter pitch.

16. A gear set as defined in claim 15 wherein the amount of offset between the axes of any two worm wheels is not more than a distance corresponding to rotation of the worm wheel along the helical worm gear through one-half pitch.

* * * * *